US008515222B2

(12) United States Patent
Cottrell et al.

(10) Patent No.: US 8,515,222 B2
(45) Date of Patent: Aug. 20, 2013

(54) METHODS AND APPARATUS FOR A FIBER OPTIC DISPLAY SCREEN HAVING AN ADJUSTABLE SIZE

(75) Inventors: William J. Cottrell, Somerville, MA (US); Nathan G. Kennedy, North Andover, MA (US)

(73) Assignee: Raytheon Company, Waltham, MA (US)

( * ) Notice: Subject to any disclaimer, the term of this patent is extended or adjusted under 35 U.S.C. 154(b) by 409 days.

(21) Appl. No.: 12/973,152

(22) Filed: Dec. 20, 2010

(65) Prior Publication Data

US 2012/0155800 A1    Jun. 21, 2012

(51) Int. Cl.
*G02B 6/26* (2006.01)
*G02B 6/42* (2006.01)

(52) U.S. Cl.
USPC .............................................. 385/31; 385/38

(58) Field of Classification Search
USPC .......................................................... 385/31
See application file for complete search history.

(56) References Cited

U.S. PATENT DOCUMENTS

| 5,222,180 | A | 6/1993 | Kuder et al. |
| 5,327,514 | A | 7/1994 | Dujon et al. |
| 5,515,470 | A | 5/1996 | Eikelmann et al. |
| 6,571,043 | B1 | 5/2003 | Lowry et al. |
| 6,587,189 | B1 | 7/2003 | Roberts et al. |
| 2003/0113088 | A1* | 6/2003 | Takeya et al. ................. 385/136 |

OTHER PUBLICATIONS

Shirinzadeh, "Laser-interferometry-based tracking for dynamic measurements", 1998, Industrial Robot: An International Journal, vol. 25, Issue 1, Abstract.
Sharp Dual Directional Viewing LCDs, Sharp Electronic Components, http://sharp-world.com/products/device/about/lcd/dual/index.html, 2 pages, copyright 2011.
U.S. Appl. No. 12/973,010, filed Dec. 20, 2010.
U.S. Appl. No. 12/972,995, filed Dec. 20, 2010.
U.S. Appl. No. 12/973,081, filed Dec. 20, 2010.

* cited by examiner

*Primary Examiner* — Uyen Chau N Le
*Assistant Examiner* — Kajli Prince
(74) *Attorney, Agent, or Firm* — Daly, Crowley, Mofford & Durkee, LLP

(57) ABSTRACT

Methods and apparatus for a fiber optic display screen of adjustable size. In one embodiment, a screen comprises: a plurality of pixels formed by a terminal end of at least one optical fiber, wherein the pixels are substantially equidistant from each other along a first axis in a first screen size and in a second screen size that is larger than the first size.

20 Claims, 11 Drawing Sheets

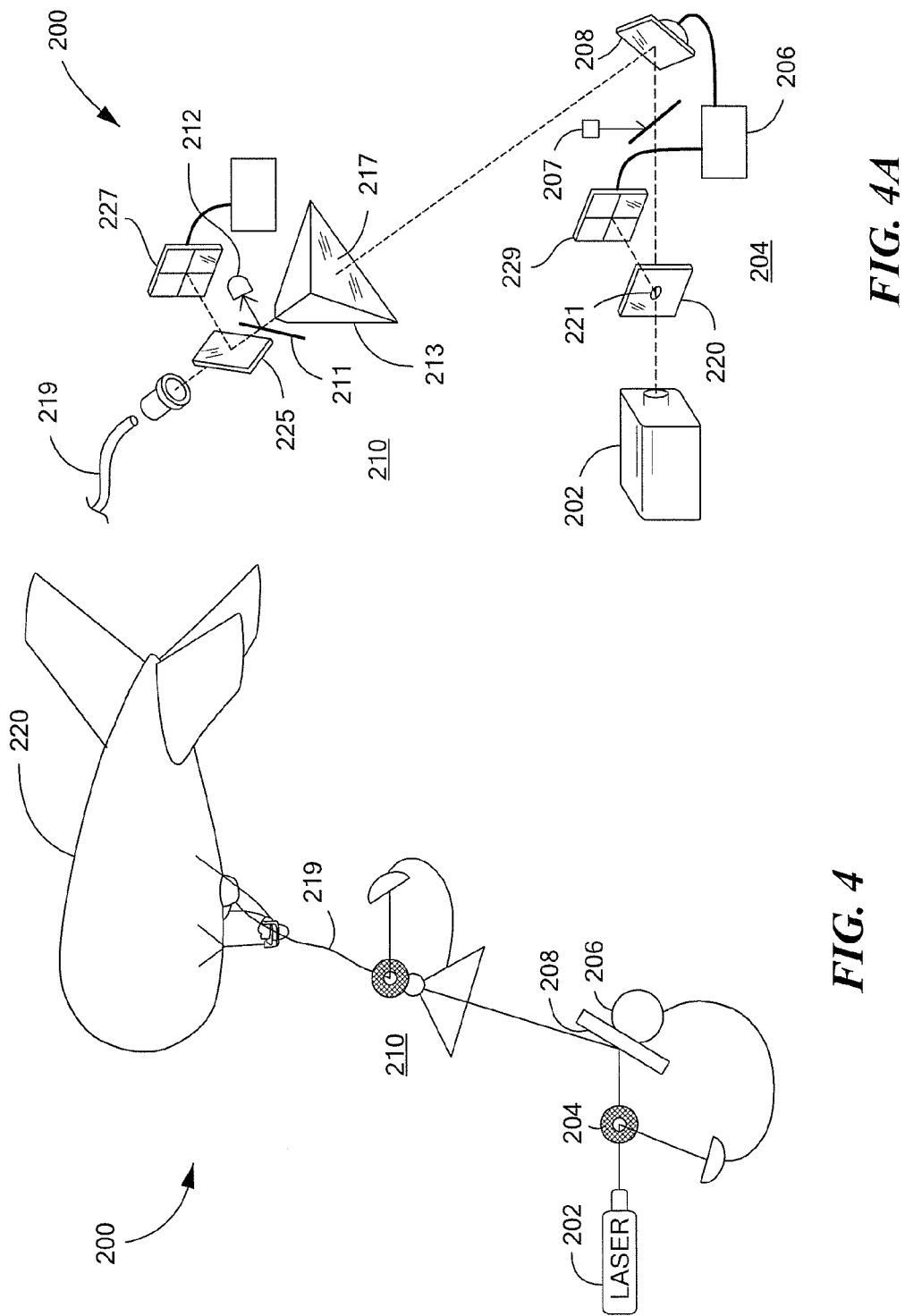

Retro reflecting coupler

METHODS AND APPARATUS FOR A FIBER OPTIC DISPLAY SCREEN HAVING AN ADJUSTABLE SIZE

BACKGROUND

As is known in the art, large electronic displays are components of modern information technology systems, particularly for outdoor display applications. These displays range from large televisions based on various technologies, e.g., plasma, LCD (Liquid Crystal Display), LED (Light Emitting Diodes), etc., to projection systems and LED screens. While these systems are deployed extensively, they generally require robust, heavy platforms to support their weight. Such systems can also require extensive cooling systems that drive up costs and limit their deployment on weight-sensitive platforms like aerostats, balloons, blimps and other aircraft. In addition, conventional displays are designed for optimal viewing at a fixed distance and angle and do not permit real time adjustments in optimal viewing distance to accommodate a change in the viewing distance of the display caused either by moving the platform closer to the viewer or the viewer moving closer to the platform. Also, deployment of such systems on billboard platforms, buildings and other venues often requires redesign or robust mounting platforms to accommodate added mass.

Fiber optic displays have also been developed which can mitigate some of these challenges, but are dependent on precisely ordering fibers, which is a difficult and costly process. U.S. Pat. No. 6,571,043 to Lowry et al. discloses a large screen fiber optic display and a method to manufacture displays. U.S. Pat. Nos. 5,327,514 and 5,515,470 disclose methods for projecting coherent images through incoherent fiber optic bundles and are incorporated herein by reference.

Prior attempts to address weight issues for large display systems include screens formed from light emitting diodes (LEDs). However, these systems have significant weight limitations due to the need for coupled cooling and electrical power.

SUMMARY

Exemplary embodiments of the invention provide methods and apparatus for a large screen fiber optic display having high fiber count. While exemplary embodiments of the invention are shown and described in conjunction with particular applications, such as aerial displays, it is understood that exemplary embodiments of the invention are applicable to display systems in general in which relatively large displays are desirable.

In one aspect of the invention, a fiber optic display screen comprises: a plurality of pixels formed by a terminal end of at least one optical fiber, wherein the pixels are substantially equidistant from each other along a first axis in a first screen size and in a second screen size that is larger than the first size.

The screen can further include one or more of the following features: the pixels are substantially equidistant from each other along a second axis in a first screen size and in a second screen size that is larger than the first size such that an aspect ratio of the screen is the same for the first and second screen sizes, terminal blocks to support each of the pixels, elastic bodies connecting adjacent ones of the terminal blocks, the elastic bodies bias the pixels to equidistant locations, interconnected modules to support the pixels, the interconnected modules include guides, each of the pixels comprises multiple optical fiber terminal ends, the screen can provide different content at different viewing angles, the screen is not physically connected to a laser source for generating images for the screen, a free space coupler to receive light from the laser source via air, and/or an aerial vehicle, wherein the screen is secured to the aerial vehicle.

In another aspect of the invention, a method comprises: employing a fiber optic display screen having a plurality of pixels formed by a terminal end of at least one optical fiber, and transitioning the screen from a first size to a second size that is larger than the first size, wherein the pixels are substantially equidistant from each other in the first screen size and in the second screen size, utilizing elastic bodies to space the pixels equidistantly, using terminal blocks to support each of the pixels, forming each of the pixels from multiple optical fiber terminal ends, providing different content from the screen at different viewing angles, locating the screen remotely from a laser source to generate images for the screen, wherein there is no physical connection between the screen and the laser source, using a free space coupler to receive light from the laser source via air, and/or securing the screen to an aerial vehicle.

BRIEF DESCRIPTION OF THE DRAWINGS

The foregoing features of this invention, as well as the invention itself, may be more fully understood from the following description of the drawings in which:

FIG. 4 is a schematic representation of a display system having an untethered vehicle with a free space coupler;

FIG. 4A is a schematic representation showing further detail for the system of FIG. 4;

DETAILED DESCRIPTION

Figure 1:
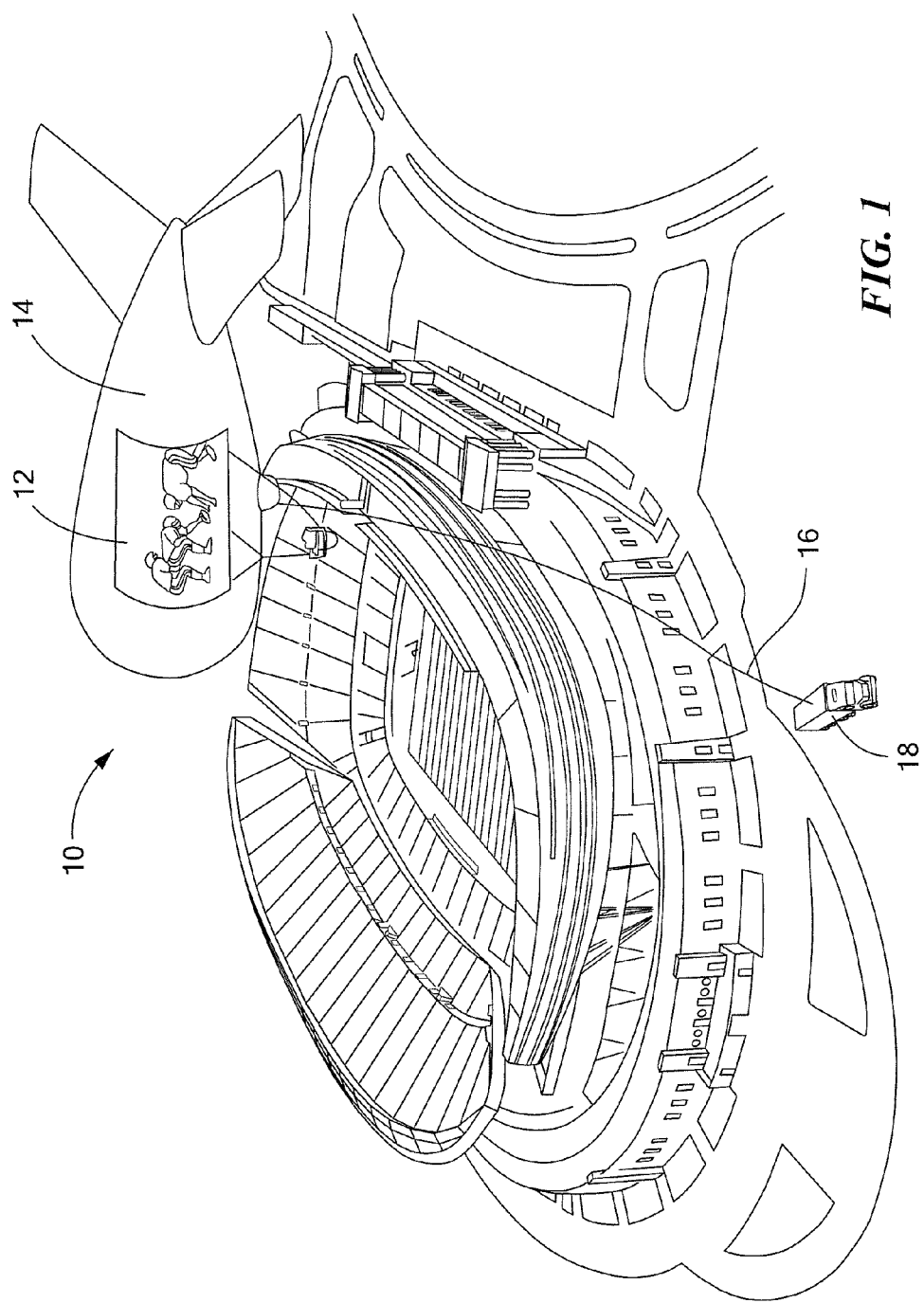
FIG. 1 is a pictorial representation of a display system having a fiber optic display screen coupled to a remote laser system.

FIG. 1 shows an exemplary display system 10 having a display screen 12 on an aerostat 14 in accordance with exemplary embodiments of the invention. In general, the relatively heavy components associated with generating the image on the display screen 12 are on the ground. In an exemplary embodiment, the aerostat 14 is tethered to a ground station 18 by a cable 16, which includes high power optical fibers to carry the illumination to a pixelator, for transmitting an image to the display screen 12. The terminal ends of a fiber optic bundle provide the light source for the display screen.

While the display screen is shown secured to an aerostat, it is understood that the screen can be supported by any vehicle, vessel, aircraft, helicopter, platform, building, and the like, to enable users to view images on the screen.

Figure 2:
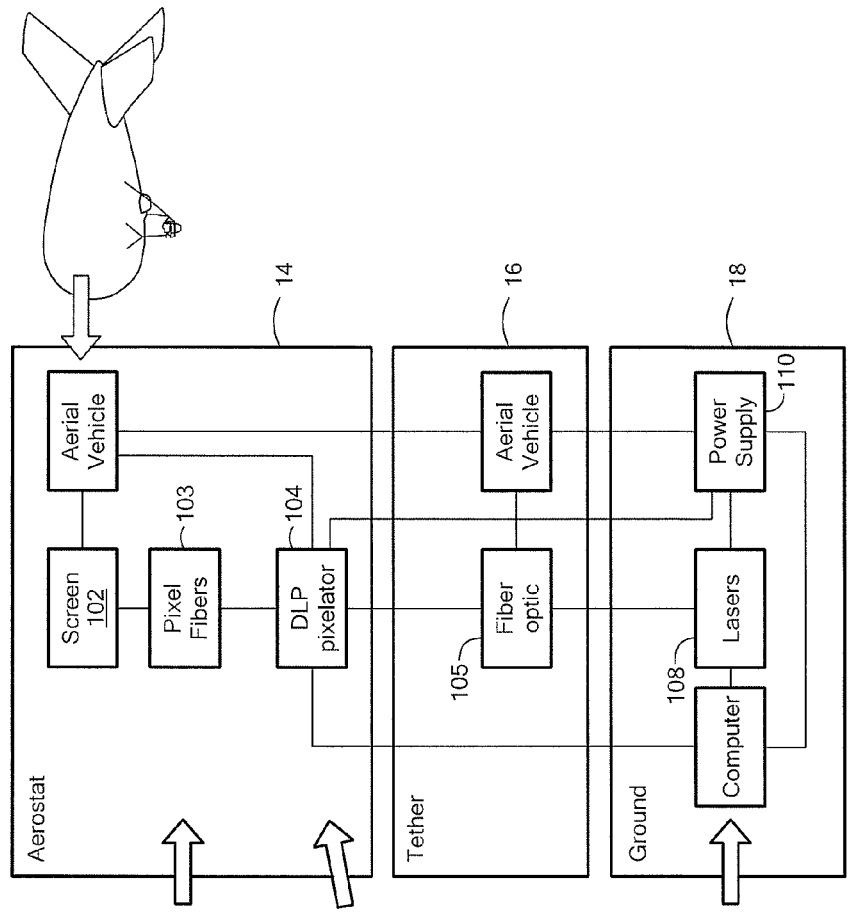
FIG. 2 is a schematic representation showing further detail for the system of FIG. 1.
Figure 2:
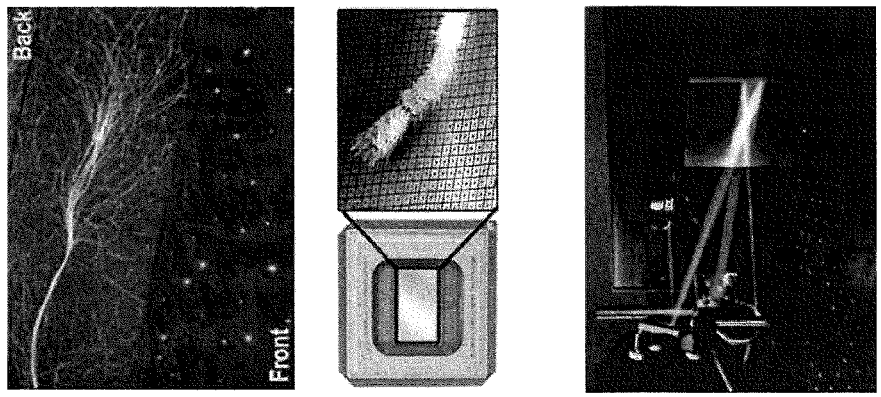
Figure 3:
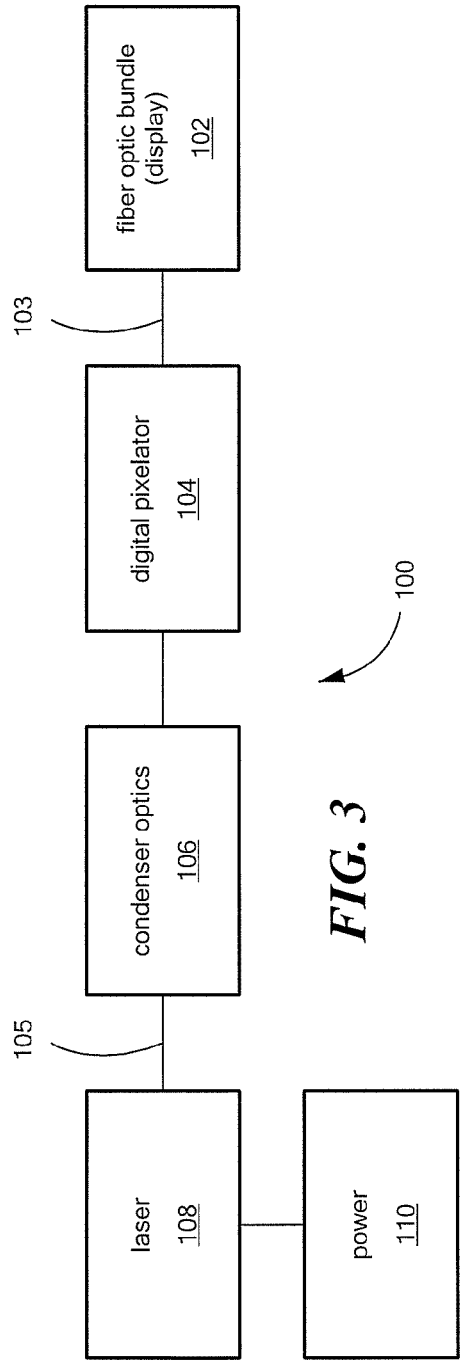
FIG. 3 is a block diagram showing further detail for the systems of FIGS. 1 and 2.

FIGS. 2 and 3 show further detail for the display system 10 of FIG. 1. The display system 10 includes a screen 102 to display images transmitted from a DLP (digital light processing) system 104 via pixel fibers 103. In general, the relatively heavy components, such as lasers 108, power circuitry 110, etc., associated with generating the images are decoupled from the display screen 102. In exemplary embodiments, the laser and associated equipment is ground-based. With this arrangement, display screens 102 can be deployed on weight-limited platforms, such as buildings, billboards, aerostats, balloons, blimps, and the like.

Light from the laser source(s) 108 is coupled into a high-power-density fiber-optic 105 relay, the distal end of which is coupled using condenser optics 106 to the digital pixelator 104, such as a DLP chip. The image formed by the pixelator 104 is then relayed with image relay optics to a fiber optic bundle 103. It is understood that the terminal ends of the fibers 103 represent the pixels of the display 102.

Figure 3A:
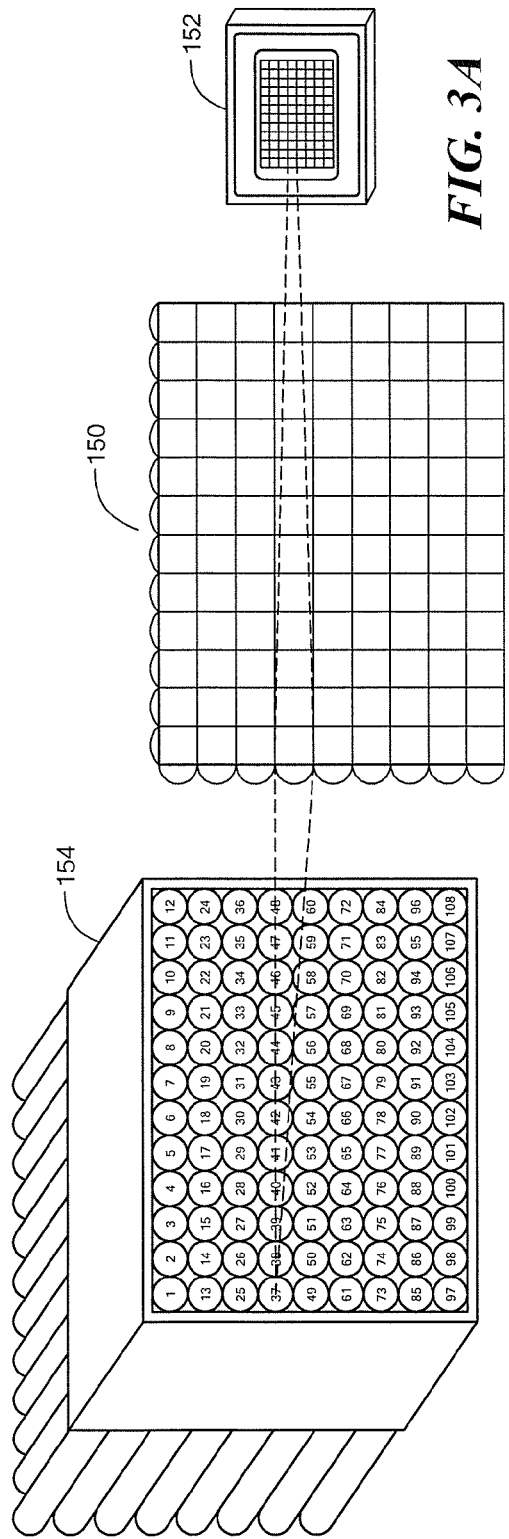
FIG. 3A is a schematic representation of a micro-lens array that can form a part of the system of FIG. 1.

FIG. 3A shows an exemplary micro-lens array 150 to receive light from the DLP unit 152 for transmission into the fiber bundle 154. Fiber to DLP to fiber is known in the art as has been used in telecommunication routing technology, as disclosed for example, in "High-yield Fabrication Methods for MEMS Tilt Mirror Array for Optical Switches," by J. Yamaguchi et al, NTT Technical Review, 2010. Micro-lens arrays are well known to one of ordinary skill in the art, as well as their use to couple fiber arrays. Air gaps in the fiber bundle can be removed from the fiber optic bundles in a variety of ways known to one of ordinary skill in the art, such as by using heated drawing as described in U.S. Pat. No. 5,222,188 "Polymer optical fiber bundle and method of making the same."

With this arrangement, the condenser 106, pixelator 104, and bundle/display 102 can be located a significant distance from the optical source 108. For example, commercially available fibers have attenuation of only a few decibels per kilometer, making efficient transmission trivial over several hundreds of meters.

Figure 4B:
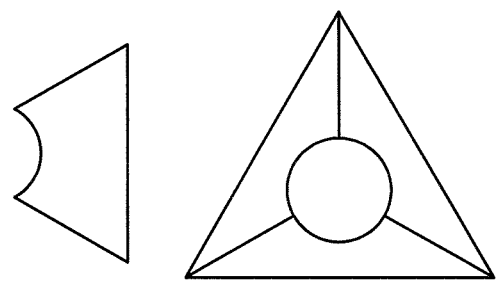
FIG. 4B is a schematic representation showing further detail for an alternative embodiment of a coupler.
Figure 5:
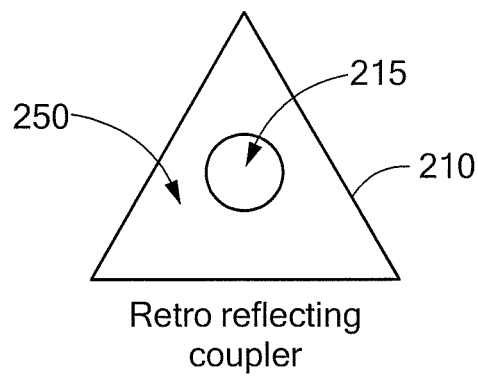
FIG. 5 is a schematic representation of a reflecting coupler that can form a part of the system of FIG. 4.
Figure 5A:
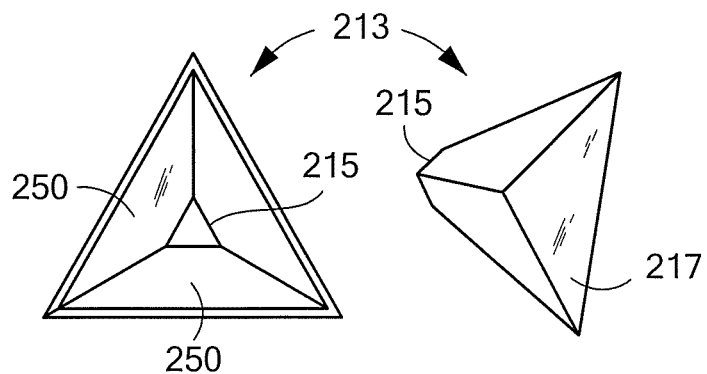
FIG. 5A is a schematic representation of a center cube prism that can form a part of the system of FIG. 4.

FIGS. 4 and 4A show a further embodiment of a display system 200 in which free space coupling is used to replace the high power fiber optics of the fiber optic source relay. As used herein, free space coupling refers to transmitting high intensity light and or image information through the air. FIGS. 5 and 5A show an exemplary retro reflecting coupler 210 having reflector guides 250 and a rear aperture 215 to receive the reflected light. By eliminating a physical connection from source to display, i.e., a physically decoupling from the optical power source, the display system weight is significantly reduced. In the illustrated embodiment, an aerostat 220 supports the retro reflecting coupler 210.

In one embodiment shown in FIGS. 4-5A, a laser source 202 is coupled into a displaced fiber optic coupler 210 that is subject to rotation and displacement, such as by wind, forward movement, etc. Feedback from the coupler 210 is used to automatically adjust for both displacement and rotation, as described below.

The laser beam output is directed through a reflective plate 220 with a central aperture 221, transmitted through a first dichroic mirror 209, and then reflected from an adjustable mirror 208 towards the fiber laser coupling unit 210. As is known in the art, a dichroic mirror refers to a glass surface coated with a film that reflects certain colors of light while allowing others to pass through. The beam received by the coupler 210 is transmitted through a corner-cube prism 213 having, instead of an apex, a rear face/aperture 215. The majority of the beam exits the rear aperture 215 and passes through a second dichroic mirror 211 to a partial beam splitter 225. A small portion of the incident beam is retro-reflected from the modified corner cube prism 210 in a direction normal to the incident beam. The portion of the beam reflected from the partial beamsplitter 225 is incident on a first quad detector 227. The remainder of the beam transmitted through the rear aperture 215 is coupled into a fiber 219 in a conventional manner. Concurrently, an infrared beam carrying image data from a first transceiver unit 207 is reflected off of the first dichroic mirror 209 and is coaxial with the laser beam. The infrared beam is reflected off of adjustable mirror 208, transmitted through corner cube prism 213, reflected off of the second dichroic mirror 211 and received by a second transceiver unit 212. The coupler 210 comprises a common rigid mounting body such that the unit moves as a single unit, which simplifies alignment.

The retro-reflected beam is reflected off the adjustable mirror 208 and is reflected off the reflector 220 with the central aperture and onto a second quad detector 229.

By providing transmission through the aperture 215, the receiving assembly can track the source. In this way the source assembly tracks and orients to the receiver and the receiver tracks and orients to the source. While the source and receiver tracking is similar, it is understood that the source uses an adjustable mirror while the receiver uses an adjustable assembly. i.e., cornercube, fiber coupler, beam splitter, etc.

Data from the first quad detector 227 is used as feedback to adjust the angle of the coupler unit 210 such that the corner cube primary facet 217 is roughly normal to the incident beam from the minor 208. Similarly, data from the second quad detector 229 is used as feedback to adjust the angle of the adjustable mirror 208 such that it directs the beam into the center of the corner cube primary facet 217. In this way, both the angle and displacement are corrected for automatically.

It is understood that further embodiments can be directed to a variety of applications, such as free space communication, such as infrared free-space telecommunication and radio-frequency communications.

It is understood that the coupler 210 can have a variety of configurations to meet the needs of a particular application. In the illustrated embodiment, for coupler 210, the incident beam propagates from the adjustable mirror 208 to the face of the cornercube 213 through a distance of free space. For illustrative purposes a Gaussian beam of red light (700 nm) with a beam waist of 5 mm that is transmitted 100 meters will have substantially all its energy contained in a diameter of 7 cm. Therefore, the rear aperture 215 of the coupler should have a clear aperture of about this diameter. Similarly, the clear aperture of the first facet 217 only needs to extend slightly beyond this diameter, e.g., a few centimeters, for small angular variations that would be experienced during use.

In one embodiment, the corner cube is a prism formed from glass. In an alternative embodiment, corner cube reflector has three reflective surfaces. In one embodiment, the rear aperture 215 is formed by cutting an elliptical section out of each of the three reflectors to create a circular aperture when viewed along the optical axis, as shown in FIG. 4B. This configuration increases the feedback signal with small misalignments of the coupler. The surfaces of the corner cube reflector can be formed from protected aluminum or other known highly reflective material across the transmitted wavelengths.

It is understood that image data can be transmitted via radio frequency, or other means known in the art instead of via the infrared transceiver system comprising transceiver unit 207, transceiver unit 212, first dichroic mirror 209 and second dichroic mirror 211.

It is understood that the adjustable mirror 208 can be provided from a variety of known mount systems. Exemplary commercially available electronically driven kinematic mirror mounts are provided by Thorlabs of Newton, N.J. A piezoelectric driven drive has angular resolution of less than 0.1 arcseconds, corresponding to linear displacements and resolution of less than 1 cm at distanced greater than 100 meters. Similarly, these drives orient at speeds in excess of 10 degrees per second, corresponding to approximately 20 meters per second platform speed.

Figure 6A:
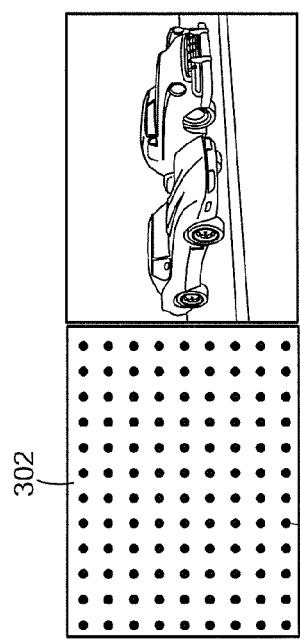
FIGS. 6A and 6B are pictorial representations of a display screen that is adjustable in size.
Figure 6B:
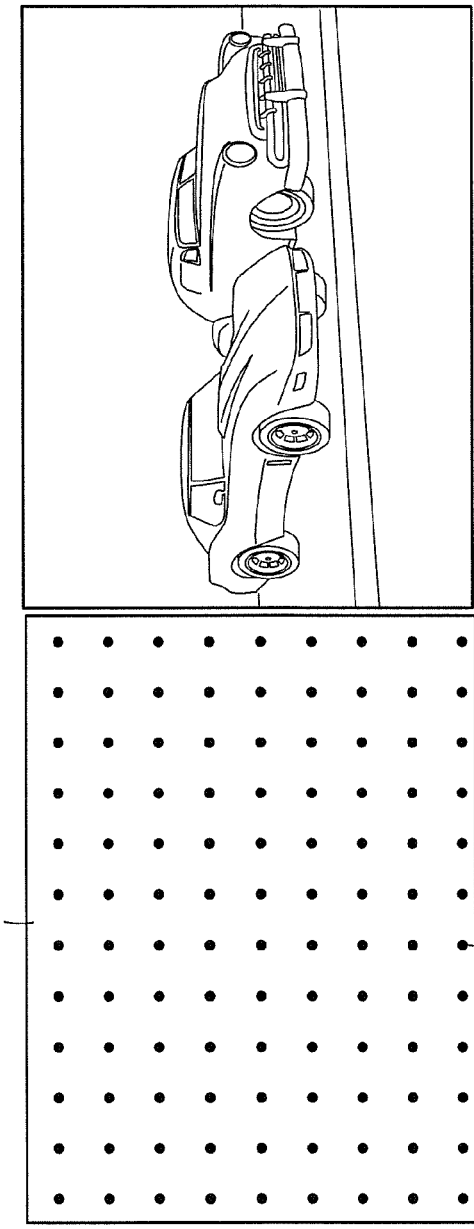

In another aspect of the invention shown in FIGS. 6A and 6B, a display system 300 includes a fiber optic display screen 302 that can modify pixel 304 spacing. With this arrangement, the screen 302 can adapt to provide optimal viewing quality at a differing viewer distances. For example, a display screen on an aerostat can dynamically alter inter pixel 304 spacing based upon how far away viewers are located. As can be seen, FIG. 6A shows the screen 302 having a first size and FIG. 6B shows the screen 302 having a second size that is larger than the first size. Exemplary images are show alongside the screen. As the screen 302 expands, the pixels 304 move apart uniformly.

In an exemplary embodiment, the fiber optic pixels are embedded in the screen 302, which is formed from an elastic material. In one embodiment, the material is flexible in at least two dimensions, e.g., x and y axes. It is understood that both the x and y axes of the display can be changed independently, thus altering the aspect ratio of the screen. In that case, equal pixel spacing occurs along each of those axes. That is, the pixels can move along the x axis, the y axis, or both axes to retain or alter the aspect ratio of the screen.

In one embodiment, an adjustable screen includes a set of pixels comprising a fiber termination mounted in a termination 'block'. A pixel block is connected to each adjacent block with at least one elastic body, such as a rubber band. With this arrangement, pixels will automatically tend to be equally spaced by virtue of Hook's law.

In order to counter the effects of gravity and ensure equal spacing in the vertical direction, spring constants of the elastic bodies (or number of elastic bodies) will vary by row because each row of pixels carries the sum of the mass of the pixels beneath it. In one embodiment, the elastic bodies have increasing spring constants. In an alternative embodiment, elastic bodies are added at each connection. In a further embodiment, a monolithic material is used in which the material stretch decreases in a gradient along the vertical axis.

Figure 6C:
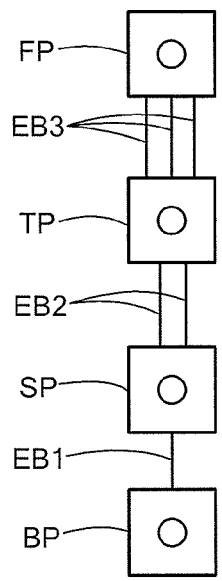
FIG. 6C is a schematic representation showing screen pixel blocks coupled by elastic bodies.
Figure 6D:
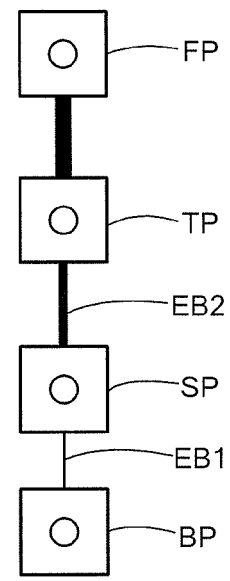
FIG. 6D is a schematic representation showing screen pixel blocks coupled by elastic bodies having different spring constants.

FIG. 6C shows a front view of a single pixel column having a bottom pixel BP connected to second pixel SP with one elastic body EB1, and a third pixel TP connected to the second pixel SP by two elastic bodies EB2. A fourth pixel FP is coupled by three elastic bodies EB3. This arrangement maintains equal spacing in the vertical axis. FIG. 6D shows a bottom pixel BP connected to a second pixel SP with a first elastic body EB1, a third pixel TP connected to the second pixel SP by a second elastic body EB2 having a spring constant greater, e.g., about twice as large, than a spring constant of the first elastic body EB1 to maintain equal spacing in the vertical axis. Each pixel is connected with a respective elastic body having a spring constant to maintain pixel spacing in the vertical axis.

To optimize the screen for a selected distance, in one embodiment, the screen is pulled from the edges at the same rate in the x and y axes to stretch the screen into a larger size. By controllably releasing the screen edges, the screen can return to a smaller size.

In general, the change in pixel spacing should be uniform across the display. That is, a change in screen size should move neighboring pixels in the center of the screen the same distance as neighboring pixels on an edge of the screen, and so on.

Exemplary materials for the screen include elastic threads, elastic cords, and other discrete elastic bodies well known to one of ordinary skill in the art.

Figure 7:
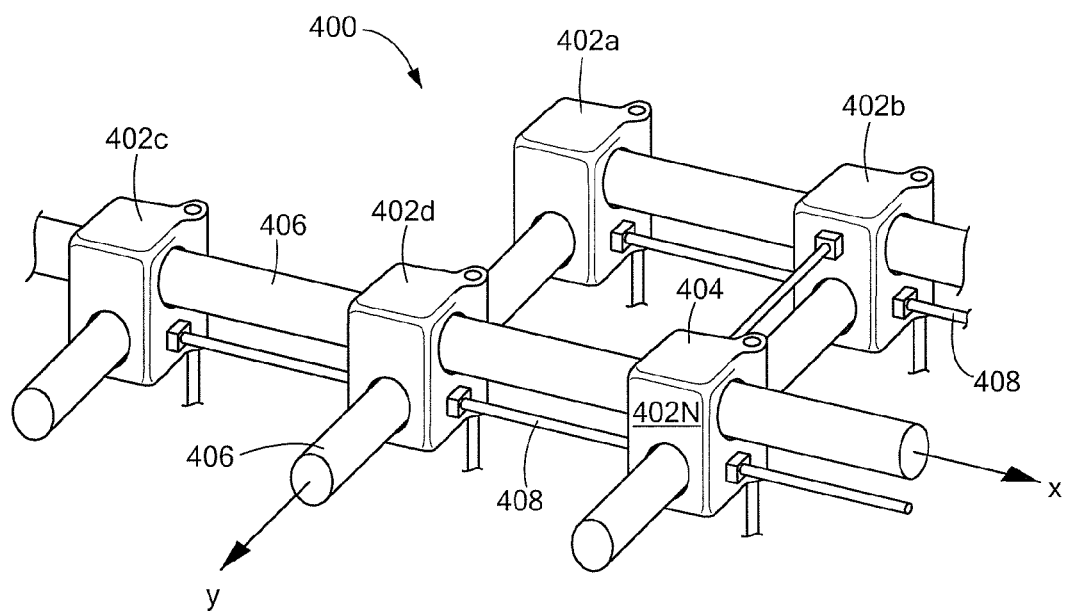
FIG. 7 is a schematic representation showing a screen with interconnected modules.
Figure 7A:
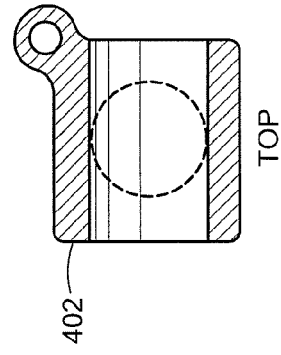
FIGS. 7A and 7B are respective top and side view of a module in FIG. 7.
Figure 7B:
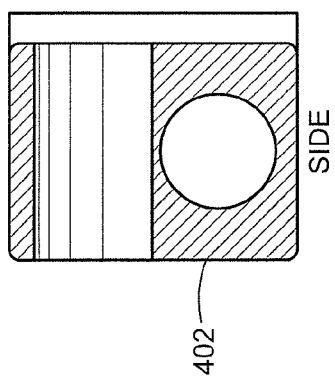

FIGS. 7-7B show an exemplary system 400 to maintain uniform pixel-to-pixel spacing in the display as the screen size changes. The system 400 includes a series of interconnected modules 402-$a$-N on which pixels 404 are mounted to form a lattice assembly. The modules 402 are interconnected by guides 406 and/or elastic spacers 408. In the illustrated embodiment, the guides enable movement of modules along the respective x and y axes. The guides 406 enable the modules 402 to move along the tracks for maintaining proper directional alignment. The spacers 408 can calibrate pixel spacing.

Figure 8A:
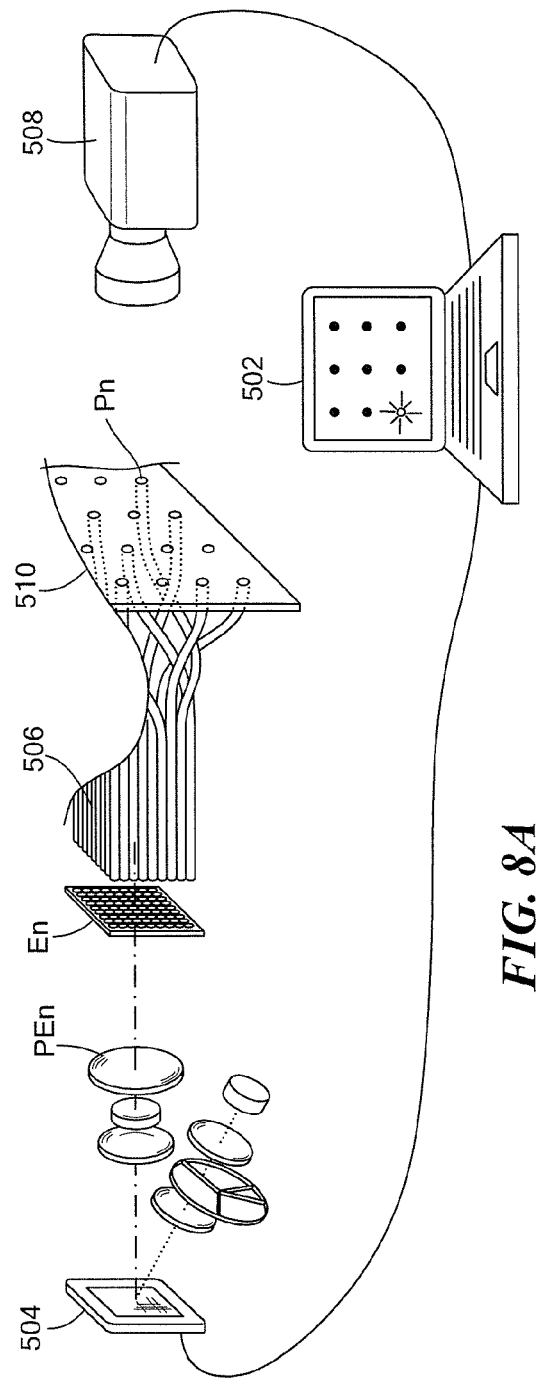
FIG. 8A is a schematic representation of a system to map an unordered fiber bundle.
Figure 8B:
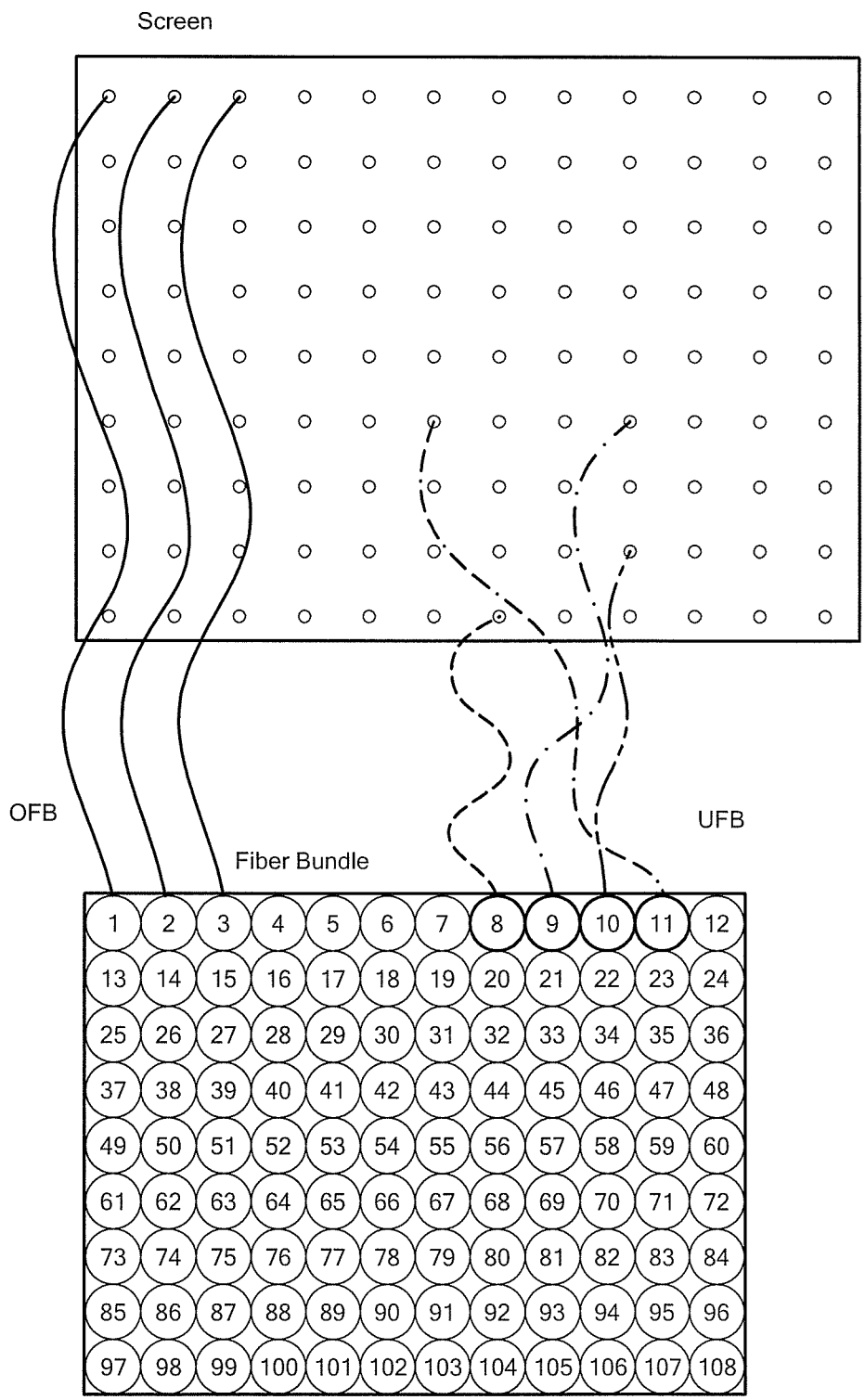
FIG. 8B is a pictorial representation of an unordered fiber bundle and an ordered fiber bundle coupled to a display screen.

In a further aspect of the invention shown in FIGS. 8A and 8B, an optical fiber arrangement for a display is provided in which fiber placement in the screen does not need to be precisely coordinated with the fiber arrangement in the distal end of the fiber bundle. This eliminates the need for a coherent fiber bundle and instead allows fiber screens to be provided without the need to coordinate the fiber-bundle tip and screen-pixel geometries.

FIG. 8A shows a system 500 to map an unordered fiber bundle. A computer 502 controls information to a digital projector 504. A mapping matrix can be determined by sequentially transmitting optical signals from a digital relay projector 504 into corresponding fibers of the bundle matrix 506 in a known order. Simultaneously, the screen output 510 from the corresponding fibers is monitored by a detector 508, such as a high-resolution digital camera. By transmitting sequentially through all the bundle matrix inputs and monitoring the corresponding output locations, a map is created to identify which digital relay projector element corresponds to each pixel of screen output. For example, digital projector element PEn corresponds to fiber bundle matrix element En, which subsequently maps to pixel Pn.

Digital media is subsequently reordered by applying this map in reverse. For example, data element DEm is reordered to be element Em. The reordered data is subsequently transmitted through the digital projector 504 and the screen output 510 now corresponds to a high-fidelity reproduction of the original data set.

With this arrangement, coherent images are produced by a particular data flow. More particularly, a coherent image is generated and encoded using a using a mapping function. The encoded image is projected into a fiber bundle. A display of the decoded image is generated at the distal end of the incoherent bundle.

In the prior art, such as U.S. Pat. No. 5,515,470, a map, which correlates two ends of an incoherent fiber bundle but does encode digital media, decode the media with an incoherent fiber bundle, and then display the content of the digital media. The '470 patent discloses the creation of a pixel map that is used to decode image data transmitted through an incoherent bundle. The data flow generating an image of an object, using an incoherent fiber bundle to encode the image, capturing the encoded image by a camera, applying a mapping function to the camera data, and decoding the image for display.

FIG. 8B shows an ordered fiber bundle OFB and an unordered fiber bundle UFB to transmit data from the input of the fiber bundle to the display screen.

In another aspect of the invention, multiplexed visual content is presented to an observer using a fiber optics screen, where each pixel element is capable of transmitting multiple content streams. With this arrangement, different information can be provided to people at different viewing angles with respect to the screen, for example.

Figure 9:
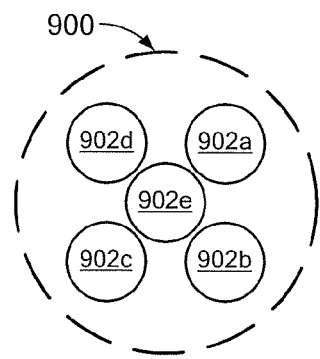
FIG. 9 is a pictorial representation of a pixel having multiple fibers.
Figure 9A:
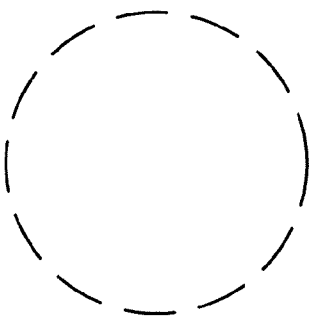
FIG. 9A is a pictorial representation of the resolvable area of the human eye.
Figure 9B:
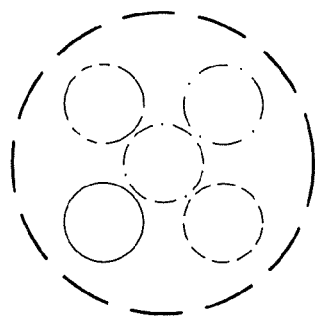
FIG. 9B is a pictorial representation of a multi-fiber, multi-channel pixel.

FIG. 9 shows a pixel 900 having multiple fibers 902*a-e*. In one embodiment, the multi-fiber pixel has a size that is less than the resolvable area of the human eye shown in FIG. 9A. FIG. 9B shows a multi-fiber, multi-channel pixel, where each fiber carries different information.

Figure 10:
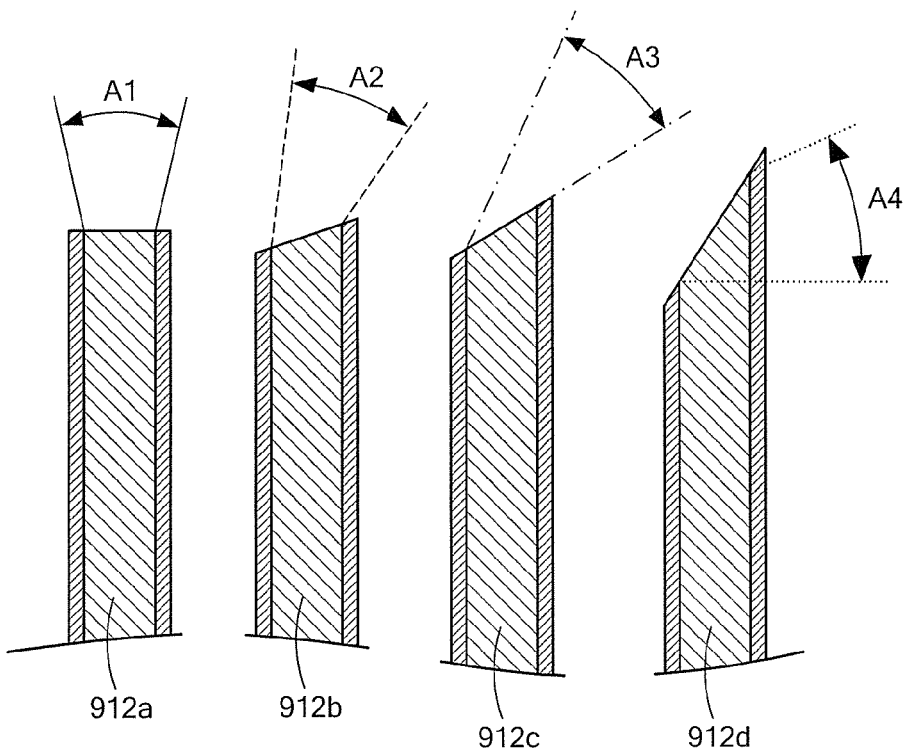
FIG. 10 is a schematic representation of fibers cleaved at different angles.
Figure 11:
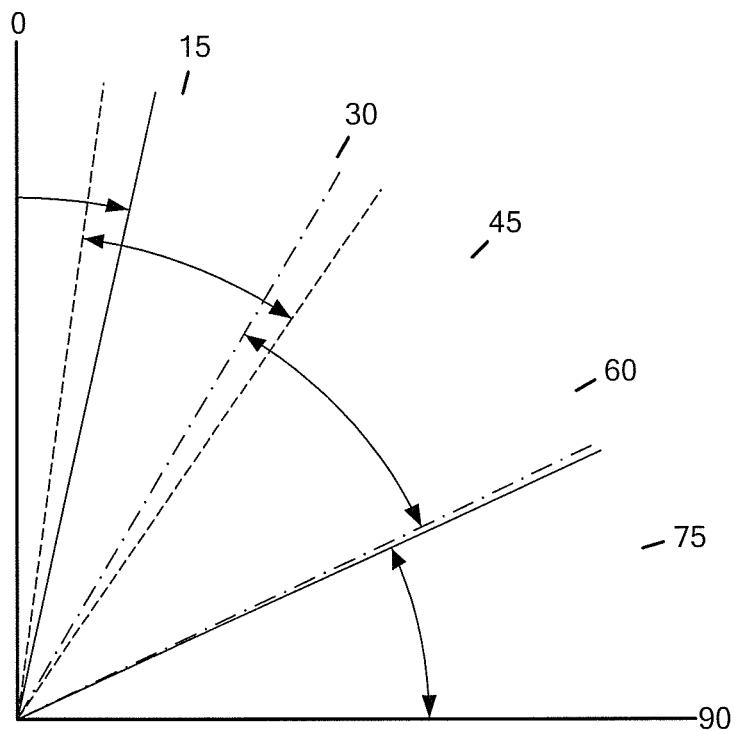
FIG. 11 is pictorial representation of viewing angles for different fiber cleave angles.

In one embodiment shown in FIG. 10, the fibers 912*a-d* are cleaved at discrete and known angles A1-4 and packaged into a pixel bundle. In this way, a single pixel can have multiplexed content that varies by viewing angle. For example, a common multimode silicate optical fiber has a numerical aperture of roughly 0.22. A fiber that is cleaved normal to the length of the fiber has a symmetrical emission viewing angle of about 25 degrees (ranging from −12.7 to +12.7 degrees). Similarly, a fiber with a cleave angle of 10 degrees also has a viewing angle of about 25 degrees but ranges from 2 to 27 degrees. In the extreme case, a fiber which is cleaved such that rays of light hit the cleave facet at angles greater than the critical angle are reflected from the facet and directed out the side of the fiber, a so called side-firing geometry as shown in fiber 912*d* at angle A4. Therefore, a set of seven fibers—cleaved at −55, −31, −15, 0, 15, 30, and 55 degrees can be used to cover the entire azimuth viewing range of 180 degrees and can deliver discrete viewing content to up to seven directions. FIG. 11 shows variation in fiber output angle as determined by the fiber cleave using a multimode silicate fiber with an NA of 0.22 and a flat facet cleave.

It is understood that fiber cleaving into a relatively narrow angle enables more efficient delivery of optical energy to the audience. This can be a factor in weight, size, cost reductions and improved audience experience.

Figure 12:
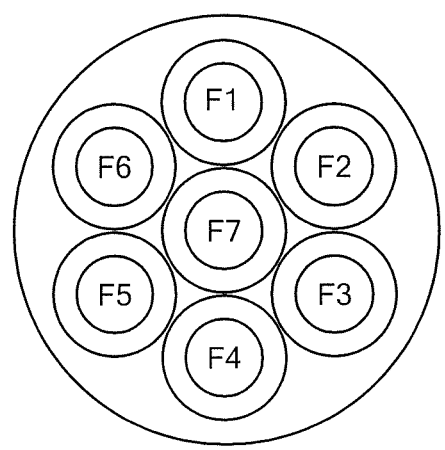
FIG. 12 is a schematic representation of a six-round-one fiber bundle.

In one embodiment shown in FIG. 12, seven fibers F1-F7 can be arranged in a six-around-one geometry. A bundle of multimode optical fibers in this geometry can have a diameter less than one millimeter. As the human eye has angular resolution of roughly one minute of arc, the source fiber would be indistinguishable at any realistic viewing distance where they eye has focal power, e.g., greater than a few centimeters.

With this arrangement, a multi-fiber pixel can be used to direct different content to different sections of a viewing audience. For example, if a display is part of a stadium size screen, playback of live action can be tailored to give a different view than what they experienced live or a similar view. Additionally, the multi-fiber pixels can inform different sections about different emergency exit instructions. Further, multi-fiber pixels can be used to overcome the challenges of parallax with viewing angle. For example, audience members at large angles to the screen would not see a distorted "scrunched" image, but rather, see content with an appropriate aspect ratio. Also, control over the range of viewing angles for a display is useful for daytime or low-power viewing. Exemplary embodiments of directional output pixels can concentrate the output power of the screen only to the appropriate audience.

In an alternative embodiment, any single fiber could be a polarization-maintaining fiber for carrying polarized data and could be used to stream three dimensional data compatible with modern 3D architectures.

It is understood that any practical number of fibers can be used to form a pixel. It is further understood that any practical number of cleaving configurations for various fiber types can be used to form a desired number of viewing angles for respective channels with various viewing angles sizes based for the selected fiber type.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A fiber optic display screen, comprising:
a plurality of pixels formed by a terminal end of at least one optical fiber, wherein the pixels are substantially equidistant from each other along a first axis in a first screen size and in a second screen size, wherein the second screen size is larger than the first screen size.

2. The screen according to claim 1, wherein the pixels are substantially equidistant from each other along a second axis in a first screen size and in a second screen size that is larger than the first size such that an aspect ratio of the screen is the same for the first and second screen sizes.

3. The screen according to claim 1, further including terminal blocks to support each of the pixels.

4. The screen according to claim 3, further including elastic bodies connecting adjacent ones of the terminal blocks.

5. The screen according to claim 4, wherein the elastic bodies bias the pixels to equidistant locations.

6. The screen according to claim 1, further including interconnected modules to support the pixels.

7. The screen according to claim 6, wherein the interconnected modules include guides.

8. The screen according to claim 1, wherein each of the pixels comprises multiple optical fiber terminal ends.

9. The screen according to claim 8, wherein the screen can provide different content at different viewing angles.

10. The system according to claim 1, wherein the screen is not physically connected to a laser source for generating images for the screen.

11. The system according to claim 10, further including a free space coupler to receive light from the laser source via air.

12. The system according to claim 10, further including an aerostat, wherein the screen is secured to the aerial vehicle.

13. A method, comprising:
    employing a fiber optic display screen having a plurality of pixels formed by a terminal end of at least one optical fiber; and
    transitioning the screen from a first size to a second size that is larger than the first size, wherein the pixels are substantially equidistant from each other in the first screen size and in the second screen size.

14. The method according to claim 13, further including utilizing elastic bodies to space the pixels equidistantly.

15. The method according to claim 13, further including using terminal blocks to support each of the pixels.

16. The method according to claim 13, further including forming each of the pixels from multiple optical fiber terminal ends.

17. The method according to claim 16, further including providing different content from the screen at different viewing angles.

18. The method according to claim 13, further including locating the screen remotely from a laser source to generate images for the screen, wherein there is no physical connection between the screen and the laser source.

19. The method according to claim 18, further including using a free space coupler to receive light from the laser source via air.

20. The method according to claim 18, further including securing the screen to an aerostat.

\* \* \* \* \*